US012692016B2

(12) United States Patent
Cooke

(10) Patent No.: US 12,692,016 B2
(45) Date of Patent: Jul. 28, 2026

(54) METHOD AND SYSTEM FOR MONITORING OPERATIONS OF LANDING GEARS OF AIRCRAFT

(71) Applicant: Airbus SAS, Blagnac (FR)

(72) Inventor: Cameron Graeme Cooke, Toulouse (FR)

(73) Assignee: Airbus SAS, Blagnac (FR)

( * ) Notice: Subject to any disclaimer, the term of this patent is extended or adjusted under 35 U.S.C. 154(b) by 139 days.

(21) Appl. No.: 18/425,142

(22) Filed: Jan. 29, 2024

(65) Prior Publication Data

US 2024/0253816 A1 Aug. 1, 2024

(30) Foreign Application Priority Data

Jan. 31, 2023 (EP) ..................................... 23305125

(51) Int. Cl.
*B64D 45/00* (2006.01)
*B64F 5/60* (2017.01)
(Continued)

(52) U.S. Cl.
CPC ......... *B64D 45/0005* (2013.01); *G06N 20/00* (2019.01); *G06T 7/74* (2017.01);
(Continued)

(58) Field of Classification Search
CPC ....... B64C 27/08; B64C 25/00; B64D 27/357; B64D 45/0005; B64U 10/16; B64U 50/37;
(Continued)

(56) References Cited

U.S. PATENT DOCUMENTS 8,042,765 B1 10/2011 Nance
2003/0011493 A1 1/2003 Wiplinger
(Continued)

FOREIGN PATENT DOCUMENTS

CN 112429252 A * 3/2021 ............. B64D 45/00

OTHER PUBLICATIONS

Machine Translation: CN-112429252-A (Year: 2021).*
European Search Report for corresponding European Patent Application No. 23305125.9 dated Jul. 11, 2023.

*Primary Examiner* — Anne Marie Antonucci
*Assistant Examiner* — Connor L Knight
(74) *Attorney, Agent, or Firm* — Greer, Burns & Crain, Ltd.

(57) ABSTRACT

A system and method for providing an operational state of a monitored landing gear of an aircraft by obtaining, in real-time, captured signals, such as images, of an actual position of the monitored landing gear. The captured signals are then transformed in a descriptor vector using Principal Components Analysis. The descriptor vector is then injected in a machine learning-based model trained and configured to transform descriptor vectors into equivalent operational states of landing gears, the equivalent operational states including up-locked, up-unlocked, in-transit, down-unlocked, and down-locked. The operational state, selected from the equivalent operational states, of the monitored landing gear is then provided to avionics of the aircraft. Finally, the operational state of the landing gear is displayed on a visual display for further analysis.

8 Claims, 4 Drawing Sheets

(51) Int. Cl.
   *G06N 20/00*          (2019.01)
   *G06T 7/73*          (2017.01)

(52) U.S. Cl.
   CPC ............... *G06T 2207/20081* (2013.01); *G06T 2207/30252* (2013.01)

(58) Field of Classification Search
   CPC .... B64U 2201/00; B64U 50/19; B64U 50/30; B60L 3/0046; B60L 58/12; B60L 58/25; B60L 58/26; B60L 58/27; H01M 10/613; H01M 10/615; H01M 10/625; H01M 10/63; H01M 10/633; H01M 10/6571; H01M 10/486; H01M 2220/20; Y02T 50/60; G06N 20/00; B64F 5/40
   See application file for complete search history.

(56) References Cited

U.S. PATENT DOCUMENTS

| | | | | |
|---|---|---|---|---|
| 2007/0124113 | A1* | 5/2007 | Foslien ................ | G05B 23/024 |
| | | | | 701/99 |
| 2009/0245657 | A1* | 10/2009 | Osugi ................... | G06V 10/771 |
| | | | | 382/209 |
| 2012/0095703 | A1 | 4/2012 | Zakrzewski et al. | |
| 2017/0283085 | A1 | 10/2017 | Kearns et al. | |
| 2020/0262588 | A1* | 8/2020 | Nakhjavani ............. | B64C 25/14 |
| 2021/0347498 | A1* | 11/2021 | Kamat ................... | B64C 25/28 |
| 2021/0354848 | A1* | 11/2021 | Kuo ....................... | B64D 45/00 |
| 2022/0126986 | A1* | 4/2022 | Gleave ................... | B64C 25/28 |
| 2023/0048696 | A1* | 2/2023 | Pesik ....................... | G06T 7/74 |

* cited by examiner

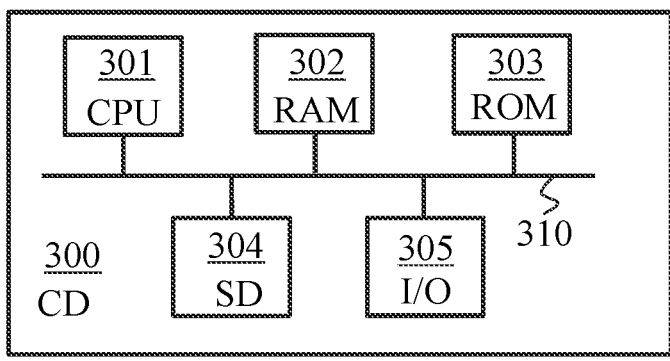

Fig. 3

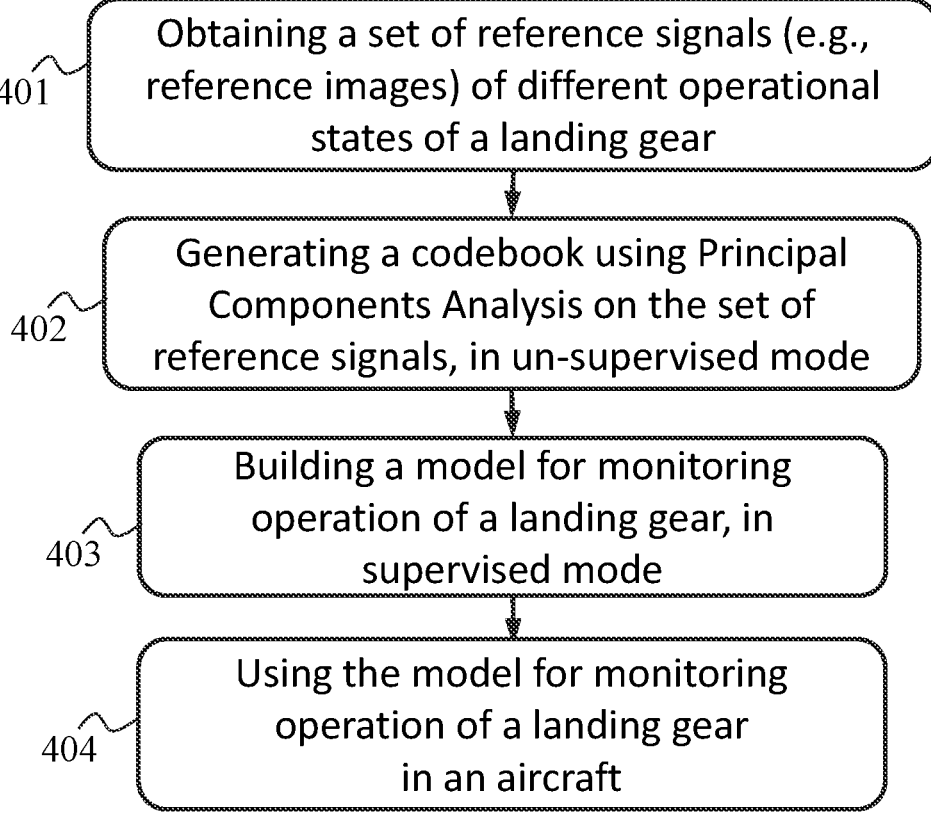

401 Obtaining a set of reference signals (e.g., reference images) of different operational states of a landing gear 402 Generating a codebook using Principal Components Analysis on the set of reference signals, in un-supervised mode 403 Building a model for monitoring operation of a landing gear, in supervised mode 404 Using the model for monitoring operation of a landing gear in an aircraft

Fig. 4

METHOD AND SYSTEM FOR MONITORING OPERATIONS OF LANDING GEARS OF AIRCRAFT

CROSS-REFERENCES TO RELATED APPLICATIONS

This application claims the benefit of European Patent Application Number 23 305 125.9 filed on Jan. 31, 2023, the entire disclosure of which is incorporated herein by way of reference.

FIELD OF THE INVENTION

The present invention relates to the field of monitoring operations of landing gears of aircrafts.

BACKGROUND OF THE INVENTION

Landing gears of aircrafts are currently monitored using numerous sensors. Proximity sensors positioned at various locations in the landing gear vicinity make it possible to detect the actual position, or operating state, of the landing gear, and thus to check in particular that the release, deployment, retraction, locking in the up position and locking in the down position are properly working. In addition to their intrinsic cost, these various sensors require regular servicing and maintenance operations to ensure reliability of the landing gear.

It is therefore desirable to provide a solution which makes it possible to dispense with all or some of these sensors for monitoring landing gears of aircrafts.

SUMMARY OF THE INVENTION

To this end, it is disclosed herein a method for providing an operational state of a monitored landing gear of an aircraft, the method being performed by a system in electronic circuitry form, the method comprising: obtaining in real-time captured signals representative of an actual position of the monitored landing gear; transforming the captured signals in a descriptor vector using Principal Components Analysis; injecting the descriptor vector in a machine learning-based model trained and configured to transform descriptor vectors into equivalent operational states of landing gears; and providing the operational state of the monitored landing gear.

Thus, thanks to the Principal Components Analysis on the captured signals (such as images) and to the trained machine learning-based model, the operational state of the monitored landing gear of the aircraft can easily be provided without having recourse to numerous sensors. Servicing and maintenance operations are therefore simplified.

In a particular embodiment, the captured signals are captured images.

In a particular embodiment, the images are captured by at least one video camera placed in the aircraft in the vicinity of the monitored landing gear, in such a way to capture images of the monitored landing gear, whatever is the operational state of the monitored landing gear during operations.

In a particular embodiment, candidate operational states of landing gears are: up-locked, up-unlocked, in-transit, down-unlocked, and down-locked.

In a particular embodiment, the operational state of the monitored landing gear is provided to avionics of the aircraft.

It is further disclosed herein a computer program product comprising instructions causing execution, by a processor, of the method above in any one of its embodiments, when said instructions are executed by the processor. It is further disclosed herein a non-transitory storage medium storing instructions causing execution, by a processor, of the method above in any one of its embodiments, when said instructions are read from the non-transitory storage medium and executed by the processor.

In a particular embodiment, the method beforehand comprises initializing the model by a computer system, as follows: obtaining a set of reference signals of candidate operational states of landing gears; generating, in un-supervised mode, a codebook of using Principal Components Analysis on the set of reference signals, the codebook gathering descriptor vectors obtained from the set of reference signals using Principal Components Analysis; building the machine learning-based model, in supervised mode, for labelling descriptor vectors with information representative of a corresponding operational state of landing gears.

In a particular embodiment, the set of reference signals is a set of reference images consisting of a plurality of images of each candidate operational state, captured with different lighting conditions and/or with different background interference.

It is further disclosed herein a system for providing an operational state of a monitored landing gear of an aircraft, the system comprising electronic circuitry configured for implementing: obtaining in real-time captured signals of the monitored landing gear; transforming the captured signals in a descriptor vector using Principal Components Analysis; injecting the descriptor vector in a machine learning-based model trained and configured to transform descriptor vectors into equivalent operational states of landing gears; and providing the operational state of the monitored landing gear.

It is further disclosed herein an aircraft comprising the system above so as to monitor operations of at least one landing gear of the aircraft.

BRIEF DESCRIPTION OF THE DRAWINGS

The characteristics of the invention mentioned above, as well as others, will appear more clearly on reading the following description of at least one embodiment, said description being made with respect to the accompanying drawings, among which:

FIG. 3 schematically illustrates an example of a hardware platform configured for implementing the control device of the system for monitoring operation of a landing gear, in a particular embodiment;

FIG. 4 schematically illustrates a flowchart of a method for initializing a model for transforming descriptor vectors into equivalent operational states of a landing gear.

DETAILED DESCRIPTION OF THE PREFERRED EMBODIMENTS

Figure 1:
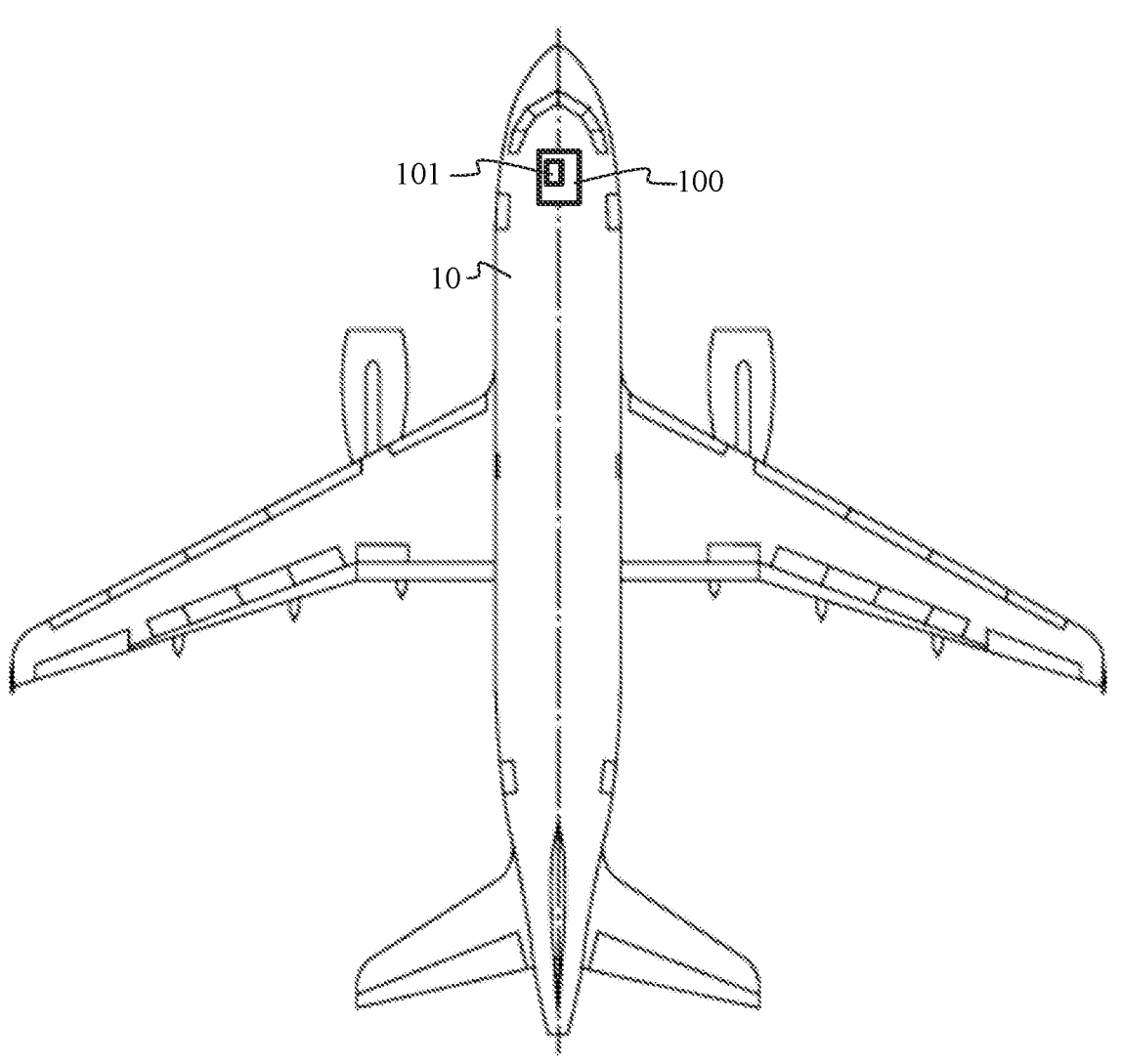
FIG. 1 schematically illustrates, in top view, an aircraft equipped with a system for monitoring operation of a landing gear, in a particular embodiment.

FIG. 1 schematically illustrates, in top view, an aircraft 10. The aircraft 10 comprises avionics 100. The avionics 100 include a control device 101 of a system 200 for monitoring operation of at least one landing gear of the aircraft 10. The control device 101 may be located elsewhere in the aircraft 10, for example nearby each landing gear that is monitored by said system. The control device 101 is in communication with the avionics 100, for example using a dedicated wiring or using a shared communication bus, so as to report in real-time an operational state of each landing gear that is monitored by said system.

In a particular embodiment, candidate operational states of the landing gear are: up-locked, up-unlocked, in-transit, down-unlocked, and down-locked. Other candidate operational states may be added, more particularly to divide the in-transit state into refined substrates.

Figure 2A:
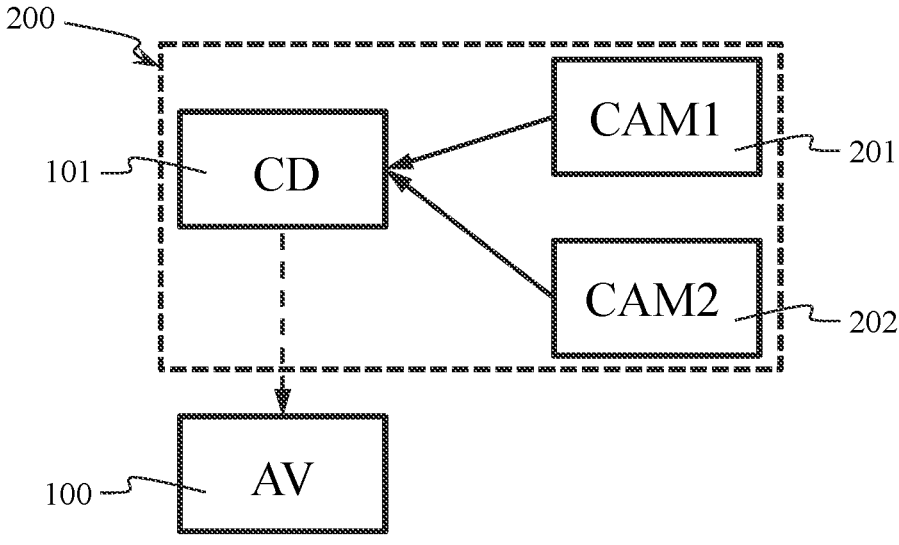
FIG. 2 schematically illustrates an arrangement of a control device of the system for monitoring operation of a landing gear, in a particular embodiment.
Figure 2B:
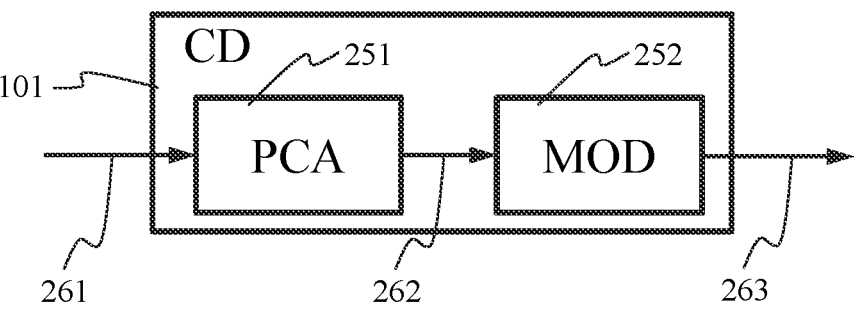

As shown in FIG. 2, the system 200 for monitoring operation of at least one landing gear of the aircraft 10 comprises at least one capturing device adapted and configured to capture in real-time signals representative of an actual position of the landing gear, whatever is the operational state of the landing gear in question during operations. The signals captured by the at least one capturing device are thus representative of the operational state of the landing gear in question.

In one embodiment, the capturing device is a video camera. The system 200 for monitoring operation of at least one landing gear of the aircraft 10 thus comprises at least one video camera. FIG. 2 illustratively shows two video cameras CAM1 201 and CAM2 202. The at least one video camera CAM1 201, CAM2 202 are placed in the aircraft in the vicinity of the landing gear to be monitored, in such a way to capture images of the landing gear in question, whatever is the operational state of the landing gear in question during operations. The images captured by the at least one video camera CAM1 201, CAM2 202 are thus representative of the operational state of the landing gear in question.

In another embodiment, the capturing device is a LIDAR ("light detection and ranging" or "laser imaging detection and ranging") device. The light signals captured by the at least one LIDAR device are thus representative of the operational state of the landing gear in question.

Signals captured by the at least one capturing device are transmitted, for example using dedicated wiring or using wireless communications, to the control device 101 for further analysis thereof. For example, images captured by the at least one video camera CAM1 201, CAM2 202 are transmitted to the control device 101 for further analysis thereof.

The control device 101 comprises an analyzer 251 configured for performing Principal Components Analysis (PCA) on signals captured by the at least one capturing device, such as the images captured by the at least one video camera CAM1 201, CAM2 202.

PCA is a statistical method for reducing dimensionality of a dataset by linearly transforming input data into a new coordinate system where the most meaningful part of data variation can be expressed with fewer dimensions. PCA is thus a process of computing principal components of a dataset and using said principal components to perform a change of basis. The first (most) principal component of a set of N original variables is a derived variable that is a linear combination of the N original variables and that exposes the most variance. The second principal component is a derived variable that is a linear combination of the N original variables and that exposes the most variance in what is left once the effect of the first principal component is removed. N iterations can thus be performed until all the variance is considered, even though fewer iterations are typically used when dimensionality reduction is targeted. The quantity of iterations to be performed is context dependent and can be defined by experiments, depending on targeted accuracy of data analysis. Using PCA on signals such as video images or LIDAR signals is particularly advantageous since such signals are highly correlated, which enables efficient dimensionality reduction.

PCA is a dimensionality reduction technique that successively includes: feature covariance computation, eigen-decomposition, principal component transformation, and principal components selection. In other words, the principal components are determined by calculating the eigenvectors and eigenvalues of the input data covariance matrix. Once eigenvectors are found from the covariance matrix, the eigenvectors are ordered by eigenvalue, in descending order. It provides the principal components listed according to their significance. Principle components selection is performed in descending order of significance so as to form a descriptor vector.

The signals 261 output by the at least one capturing device, such as the images received from the at least one video camera CAM1 201, CAM2 202, are input to the analyzer 251, which processes said input signals 261 according to PCA principles, so as to provide the descriptor vector 262 (also referred to as feature vector), which is therefore reduced in terms of dimensionality compared with the input signals 261.

The control device 101 comprises a model 252 configured to transform descriptor vectors into equivalent operational states of the landing gear. The model 252 is a machine learning-based model trained to transform descriptor vectors into equivalent operational states of the landing gear. The descriptor vector 262 is thus input to the model 252, which processes said descriptor vector 262, so as to provide an equivalent operational state 263 of the monitored landing gear. The control device 101 is configured to provide said equivalent operational state 263 to the avionics 100 so that a pilot of the aircraft 10 is informed in the cockpit about the operational state of the landing gear in question.

The analyzer 251 and the model 252 are initialized using a method which is disclosed hereafter with respect to FIG. 4.

Figure 5:
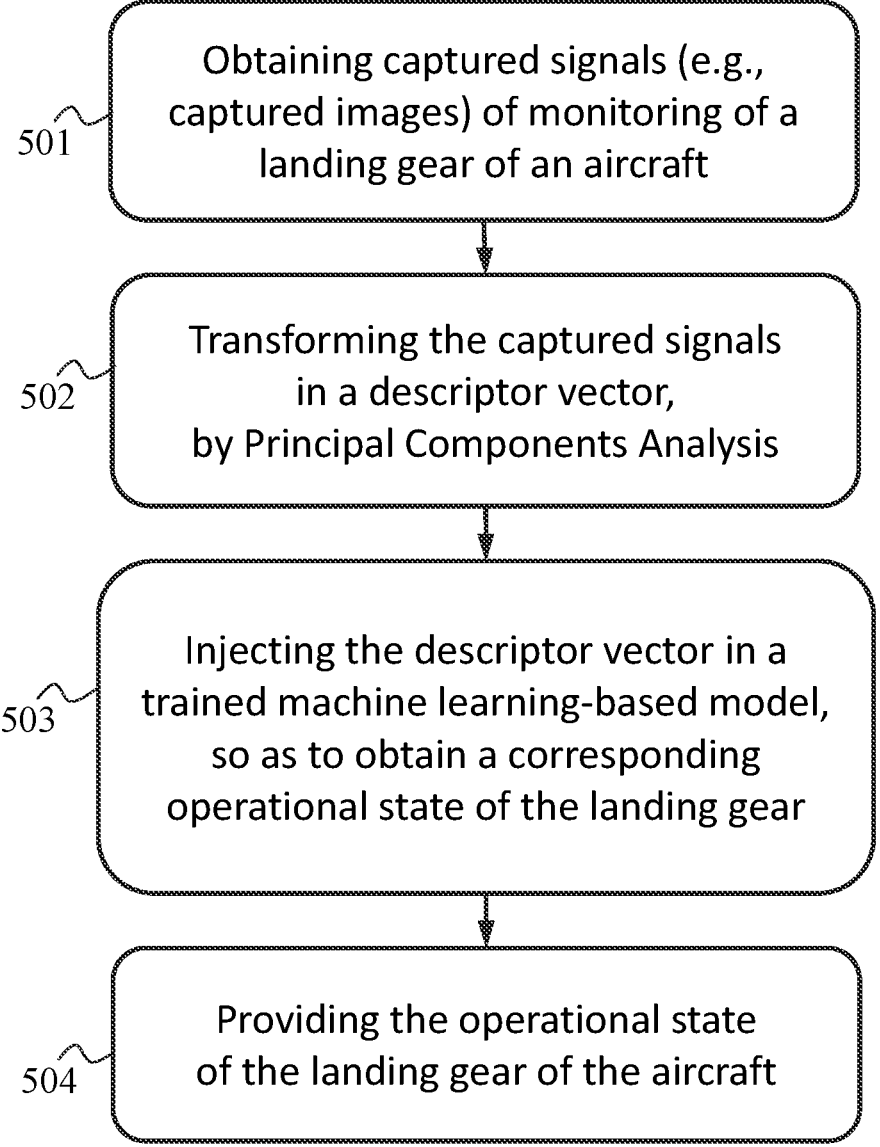
FIG. 5 schematically illustrates a flowchart of a method for using the control device of the system for monitoring operation of a landing gear.

The analyzer 251 and the model 252 jointly operate onboard the aircraft using a method which is disclosed in more detail hereafter with respect to FIG. 5.

FIG. 3 schematically illustrates an example of a hardware platform 300, in form of electronic circuitry, which is configured to implement the control device 101.

The hardware platform 300 comprises, interconnected by a communication bus 310: a processor or CPU ("Central Processing Unit") 301; a RAM ("Read-Only Memory") 302; a ROM ("Read Only Memory") 303 or EEPROM ("Electrically-Erasable Programmable ROM"), such as a Flash memory; a storage device 304, such as a Hard Disk Drive or a reader device for reading a non-transitory storage medium, such as an SD ("Secure Digital") card reader; and an I/O ("Input/Output") manager 305.

The I/O manager 305 enables the hardware platform 300 to interact with one or more items of equipment of the aircraft 10, such as the avionics 100 or other items of equipment of the system for monitoring operation of at least one landing gear of the aircraft 10, such as video cameras.

CPU 301 is able to execute instructions loaded in RAM 302 from ROM 303, or from an external memory, or from a non-transitory storage medium (such as an SD card), or from a communications network. When the hardware platform 300 is powered up or booted, CPU 301 is able to read instructions from RAM 302 and to execute these instructions. These instructions form a computer program causing implementation, by CPU 301, of all or part of the steps and operations disclosed herein with respect to the control device 101.

All or part of the steps and operations disclosed herein with respect to the control device 101 may be implemented in software form by executing a set of instructions by a programmable machine, such as a processor of DSP ("Digital Signal Processor") type or a microcontroller, or be implemented in hardware form by a chip or chipset, such as an FPGA ("Field Programmable Gate Array") or an ASIC ("Application Specific Integrated Circuit"). In general terms, the hardware platform 300 comprises electronic circuitry configured to implement all or part of the steps and operations disclosed herein with respect to the control device 101.

FIG. 4 schematically illustrates a flowchart of a method for initializing the model 252. The method of FIG. 4 is performed by a computer system. The computer system is for example physically arranged according to the hardware platform 300 depicted in FIG. 3 and detailed above with respect to the control device 101.

In a step 401, the computer system obtains a set of reference signals, such as reference images, of the candidate operational states of a reference landing gear. The reference landing gear corresponds to a type of landing gear equipping aircrafts for which monitoring of landing gear operations using the at least one capturing device, such as the aforementioned video cameras, is foreseen. The set of reference signals corresponds to signals which have been captured by at least one capturing device installed in a relative position with respect to the reference landing gear in substantially the same way as the at least one capturing device installed in the aircraft 10 (i.e., identical physical configuration for initialization and for on-the-field operations). When referring to the particular embodiment where in the at least one capturing device is at least one respective video camera, the set of reference images corresponds to images which have been captured by video cameras installed in a relative position with respect to the reference landing gear in substantially the same way as the at least one aforementioned video camera CAM1 201, CAM2 202 (i.e., identical physical configuration for initialization and for on-the-field operations).

The set of reference signals consists of at least one signal representative of each candidate operational state of the reference landing gear.

When referring to the particular embodiment where in the at least one capturing device is at least one respective video camera, the set of reference signals is a set of reference images consisting of at least one image representative of each candidate operational state of the reference landing gear. The set of reference images preferably consists of a plurality of images of each operational state of the reference landing gear, captured with different lighting conditions and/or with different background interference, etc., in order to improve classification efficiency of the model 252 to be initialized.

In a step 402, the computer system generates a codebook using Principal Components Analysis on the set of reference signals (e.g., on the set of reference images). The codebook is generated in un-supervised mode, meaning automatically without human intervention. Each reference signal (e.g., reference image) is thus transformed in a descriptor vector, as already explained, and then included in the codebook. The generated codebook thus gathers the descriptor vectors of the reference signals (e.g., reference images), each descriptor vector being stored in the codebook and associated with the reference signals (e.g., the reference image) to which the descriptor vector in question corresponds, or associated with information derived from the reference signals (e.g. the reference image) to which the descriptor vector in question corresponds.

In a step 403, the computer system builds the model 252 for monitoring operation of a landing gear, using supervised machine learning. The model 252 is built from the generated codebook in supervised mode, meaning with human support for labelling descriptor vectors with information representative of a corresponding operational state of the landing gear. The reference signal (e.g., reference image) is used to determine to which operational state of the landing gear each descriptor vector corresponds. For example, an adequate label is found by visual inspection of the reference image in question.

For example, the model 252 is built using logistic regression, Support Vector Machines (SVM), K-Nearest Neighbors (KNN), or any other supervised machine learning approach.

This completes the initialization of the model 252.

In a step 404, the computer system provides the model 252. The model 252 is used in an aircraft for monitoring operation of a landing gear, as in the system 200 for monitoring operation of at least one landing gear of the aircraft 10.

FIG. 5 schematically illustrates a flowchart of a method for using the control device 101.

In a step 501, the at least one capturing device, such as the at least one video camera CAM1 201, CAM2 202, captures images of the monitored landing gear. The control device 101 obtains the captured signals from the at least one capturing device. For example, the control device 101 obtains the captured images from the video camera CAM1 201, CAM2 202 in real-time.

In a step 502, the control device 101 transforms the captured signals (such as the captured images) into a descriptor vector by applying PCA. With respect to FIG. 2, the step S502 is performed by the analyzer 251.

In a step 503, the control device 101 injects the descriptor vector in the model 252, so as to obtain in real-time a corresponding operational state of the monitored landing gear.

In a step 504, the control device 101 provides the operational state of the monitored landing gear to the avionics 100 of the aircraft 10, for example for further display in visual form to the pilot in the cockpit of the aircraft 10.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for providing an operational state of a monitored landing gear of an aircraft, the method being performed by a system comprising electronic circuitry, the method comprising:

obtaining, in real-time, captured signals representative of an actual position of the monitored landing gear;

transforming the captured signals in a descriptor vector using Principal Components Analysis;

injecting the descriptor vector in a machine learning-based model trained and configured to transform descriptor vectors into equivalent operational states of landing gears, the equivalent operational states consisting of up-locked, up-unlocked, in-transit, down-unlocked, and down-locked;

providing an operational state of the monitored landing gear to avionics of the aircraft, the operational state identified as one of the equivalent operational states;

displaying the operational state of the landing gear for further analysis by the avionics; and modifying, via the avionics, control surfaces of the aircraft responsive to the operational state of the landing gear.

2. The method according to claim 1, wherein the captured signals are captured images.

3. The method according to claim 1, wherein the images are captured by at least one video camera located in the aircraft in a vicinity of the monitored landing gear in such a way so as to capture the images of the monitored landing gear regardless of the operational state of the monitored landing gear.

4. The method according to claim 1, wherein, before the obtaining, the method comprises initializing the machine learning-based model by a computer system by:

obtaining a set of reference signals representative of candidate operational states of landing gears;

generating, in an un-supervised mode, a codebook of using Principal Components Analysis on the set of reference signals, the codebook gathering descriptor vectors obtained from the set of reference signals using Principal Components Analysis; and, building the machine learning-based model, in a supervised mode, for labelling descriptor vectors with information representative of a corresponding operational state of landing gears.

5. The method according to claim 4, wherein the set of reference signals is a set of reference images comprising a plurality of images of each candidate operational state, captured with different lighting conditions, with different background interference, or both.

6. A non-transitory storage medium storing a computer program comprising instructions which, when executed by a processor, perform the method according to claim 1.

7. A system for providing an operational state of a monitored landing gear of an aircraft, the system comprising:

at least one capturing device to capture signals of the monitored landing gear; and electronic circuitry configured to:

obtain, in real-time, the captured signals representative of an actual position of the monitored landing gear from the at least one capturing device;

transform the captured signals in a descriptor vector using Principal Components Analysis;

inject the descriptor vector in a machine learning-based model trained and configured to transform descriptor vectors into equivalent operational states of landing gears, the equivalent operational states consisting of up-locked, up-unlocked, in-transit, down-unlocked, and down-locked;

provide an operational state of the monitored landing gear to avionics of the aircraft, the operational state identified as one of the equivalent operational states;

display the operational state of the landing gear for further analysis by the avionics; and modify, via the avionics, control surfaces of the aircraft responsive to the operational state of the landing gear.

8. An aircraft comprising:

at least one landing gear; and, the system according to claim 7.

* * * * *